(12) United States Patent
Clements

(10) Patent No.: US 6,763,088 B1
(45) Date of Patent: Jul. 13, 2004

(54) MEDICAL DISPATCH SYSTEM

(75) Inventor: Harold A. Clements, McComb, MS (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 0 days.

(21) Appl. No.: 10/282,645

(22) Filed: Oct. 29, 2002

(51) Int. Cl.[7] .............................................. H04M 11/00
(52) U.S. Cl. ......................... 379/38; 379/37; 379/9.03
(58) Field of Search ........................ 379/38, 9.03, 9.04, 379/9, 32.01, 32.04, 33, 39, 37, 45

(56) References Cited

U.S. PATENT DOCUMENTS 5,953,389 A * 9/1999 Pruett et al. .................. 379/34
6,317,039 B1 * 11/2001 Thomason .................. 340/539
6,402,691 B1 * 6/2002 Peddicord et al. ............ 379/38
6,614,882 B1 * 9/2003 Beamon et al. ............... 379/30

* cited by examiner

Primary Examiner—Stella Woo
(74) Attorney, Agent, or Firm—Thomas, Kayden, Horstemeyer & Risley LLP

(57) ABSTRACT

A medical dispatch system comprises a dispatch processing system for processing service repair requests from customers and a work list generated by the dispatch processing system that includes an indicator that a customer is under a medical maintenance plan. The work list indicates that residential customers under the medical maintenance plan will receive a higher priority over other residential customers not under the medical maintenance plan. A technician processing system is coupled to the dispatch processing system utilizing a communications network. The technician processing system receives the work list from the dispatch processing system and displays the work list of service repair requests. Other systems and methods are also provided.

24 Claims, 7 Drawing Sheets

| CUSTOMER INFORMATION | 601-555-1111 BOB JONES, 1111 SPEED RD. |
|---|---|
| SERVICE PLANS | MMP, IWP |
| DESCRIPTION | OOSY NDT, CUSTOMER ELDERLY NEEDS |
|  | HELP ASAP |
| FACILITIES | 4W32 |

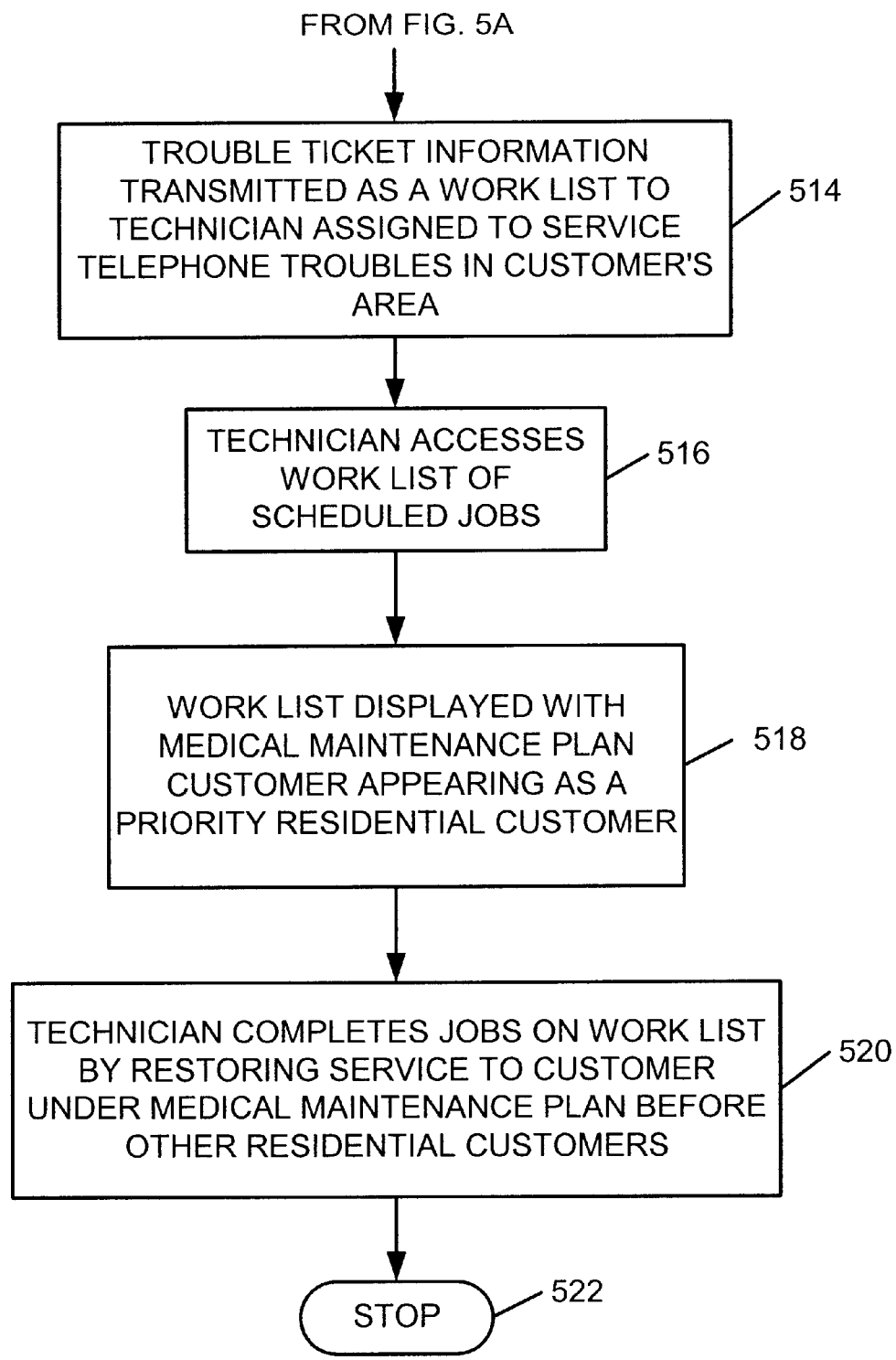

MEDICAL DISPATCH SYSTEM

TECHNICAL FIELD

The present invention is generally related to telephone systems and, more particularly, is related to repairing telephone systems.

BACKGROUND OF THE INVENTION

Telephone service provides a lifeline for certain customers. For the elderly, people with disabilities, critical medical conditions, or other illnesses that limit mobility, the telephone serves as a manner in which to communicate with care providers outside of the home, such as health care personnel who respond in an emergency or otherwise. For example, an elderly person may depress a switch that utilizes the telephone line to place a call for emergency medical personnel or other health care personnel that come to the patient's home to provide care. Others may utilize their telephone to contact family members when medications are required or for other reasons. Thus, by utilizing telephone service along with other specialized equipment, medical personnel, or others may be notified immediately when a person is in distress.

In certain telephone service areas, a telephone technician serves multiple functions. For example, the technician may install new services and repair outages for both business and residential customers. Currently, when a technician receives a repair request for both a business and residential customer, the business customer's service is repaired before the residential customer. Normally, residential customers receive the same priority for telephone service restoration regardless of any special needs of certain residential customers. Customers may attempt to receive a higher priority by stating that they have a medical emergency when they call in their trouble report. Technicians use best efforts to honor these requests, however, preferential service is not guaranteed.

Unfortunately, experience has shown that at times, unscrupulous individuals call in a telephone repair request indicating they have a medical emergency when they do not. Without knowledge that no emergency condition exists, telephone company personnel may attempt to give effective preference to the unscrupulous individual by placing the unscrupulous individual's repair request as a higher importance over other residential customers awaiting repair service. The dispatched technician may also not know that the repair request should not be handled on a different basis until arriving at the residence to make repairs. As a result of this deceptive repair request, other customers have had repair requests delayed.

Thus, a heretofore-unaddressed need exists for a solution that addresses the aforementioned deficiencies and inadequacies.

SUMMARY OF THE INVENTION

The preferred embodiments of the present invention provide systems and methods for providing a medical dispatch system.

Briefly described, in architecture, one preferred embodiment of one system, among others, can be implemented as follows. A medical dispatch system comprises a dispatch processing system for processing service repair requests from customers and a work list generated by the dispatch processing system. The work list includes an indicator that a customer is under a medical maintenance plan. A technician processing system receives the work list from the dispatch processing system and displays service repair requests. Residential customers under the medical maintenance plan will receive a higher priority over residential customers not under a medical maintenance plan.

The preferred embodiment of the present invention can also be viewed as providing methods for providing a service. In this regard, one embodiment of such a method, among others, can be broadly summarized by the following steps: receiving a request from a customer for priority repair service; determining whether the customer is eligible to receive priority repair service based upon a medical maintenance plan; and dispatching a technician to the customer's residence for a priority repair service when the customer qualifies under the medical maintenance plan.

Other systems, methods, features, and advantages of the present invention will be or become apparent to one with skill in the art upon examination of the following drawings and detailed description. It is intended that all such additional systems, methods, features, and advantages be included within this description, and be within the scope of the present invention.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIGS. 5A and 5B are flowcharts depicting general functionality, in accordance with one preferred embodiment, of an implementation of a medical dispatch system.

DETAILED DESCRIPTION OF THE PREFERRED EMBODIMENTS

Disclosed herein are systems and methods for providing a medical dispatch system. To facilitate description of the inventive systems, an example system that can be used to implement the systems and methods for providing a medical dispatch system is discussed with reference to the figures. Although this system is described in detail, it will be appreciated that this system is provided for purposes of illustration only and that various modifications are feasible without departing from the inventive concept. After the example system has been described, an example of the operation of the system will be provided to explain the manner in which the system can be used to provide a medical dispatch system.

Figure 1:
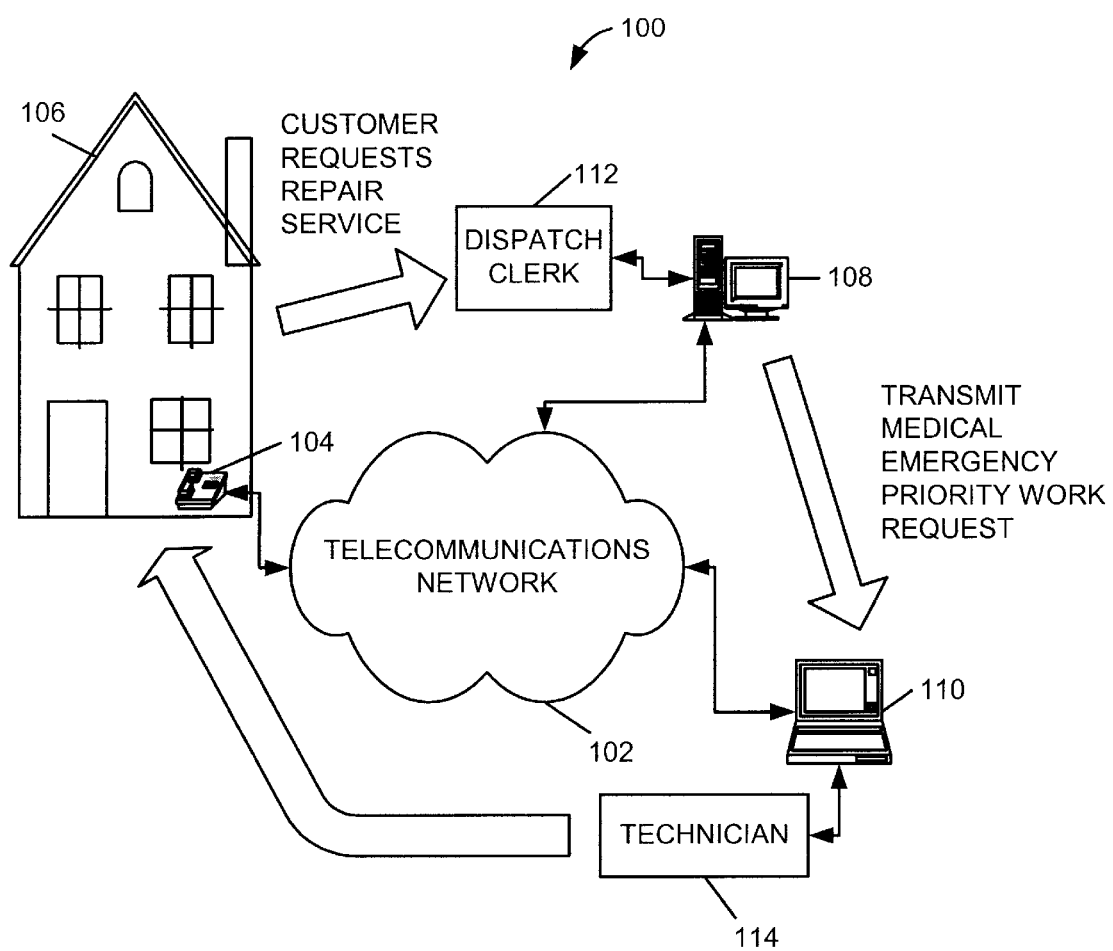
FIG. 1 is a block diagram depicting a preferred embodiment of a medical dispatch system.

Referring now in more detail to the drawings, in which like numerals indicate corresponding parts throughout the several views, FIG. 1 is a block diagram depicting a preferred embodiment of a medical dispatch system 100. The system 100 includes a telecommunications network 102 that couples to a telephone 104, such as a wireline or wireless telephone in a residence 106, a plurality of telephone company work center processing devices 108 (only one shown for simplicity), and a plurality of portable processing devices 110 (only one shown for simplicity), such as a laptop computer with technical worklist software. The telecommunications network 102 may be any type of communications network employing any network topology, transmission medium, or network protocol. For example, such a network may be any public or private packet-switched or other data network, including the Internet, circuit-switched network, such as a public switch telecommunications network (PSTN), wireless network, or any other desired communications infrastructure and/or combination of infrastructure.

The work center-processing device 108 includes applications such as a medical dispatch application (or functionality in dispatch and/or customer record software), among others, that enable a dispatch clerk 112 to process service requests from customers in accordance with preferred embodiment of the present invention. As will be understood by one reasonably skilled in the art, in one embodiment, service requests include requests for installation of new service, modification to existing service, or repair of existing service, among others. The work center-processing device 108 can encompass a server configured to access databases of customer service records. In one embodiment, the customer service records are stored in a data center of the telecommunications network 102. In another embodiment, the customer service records are stored on processing devices, such as server or mainframe computers, in work management centers (WMC) that administer and manage customer service records and personnel who interface with customers, among other duties.

Further, the work center-processing device 108 is configured to recognize caller identification information (caller ID) and/or automatic number information (ANI) which provides the telephone number of an incoming call. In one embodiment, the dispatch clerk 112 utilizes the customer's telephone number to access the customer's record. In another embodiment, the dispatch clerk 112 utilizes the customer's address to access the record. In still another embodiment, the dispatch clerk 112 requests other identifying information from the customer to either access the customer's record or to create a new record.

In one embodiment, a technician 114 is assigned a particular territory to provide installation and/or maintenance telephone support for residential and/or business customers. Preferably, the technician 114 is assigned a laptop computer 110 configured to interface with the work center processing device 108 and the telecommunications network 102. In one embodiment, the laptop computer 110 is configured to receive work requests transmitted from the work center-processing device 108 such as through a wireless radio communication. In a preferred embodiment, the work requests can be configured as work lists assigned to the technician 114 including, for example, daily, weekly, or monthly service requests.

Preferably, the work list includes business customer service requests, residential customer service requests, and other requests that require the technician 114 to complete work. Requests can include installation and maintenance of facilities, inside wiring, and outside construction, among others. In addition, in accordance with preferred embodiments, the work list also includes a priority indicator for customers under a medical maintenance plan. In one preferred embodiment of the invention, the dispatch clerk 112 verifies the authenticity of the priority for the customer under the medical maintenance plan before the work list is transmitted to the technician 114. In another preferred embodiment of the invention, verification of the authenticity of the customer takes place before the customer is allowed to be on a medical maintenance plan. The verification process can include receiving supporting documentation from the customer regarding conditions that qualify under the medical maintenance plan. Residential customers under a medical maintenance plan receive a higher priority over other residential customers. Thus, the technician 114 that receives a work list with a customer under a medical maintenance plan shall make arrangements to visit that customer on a priority basis.

Figure 2:
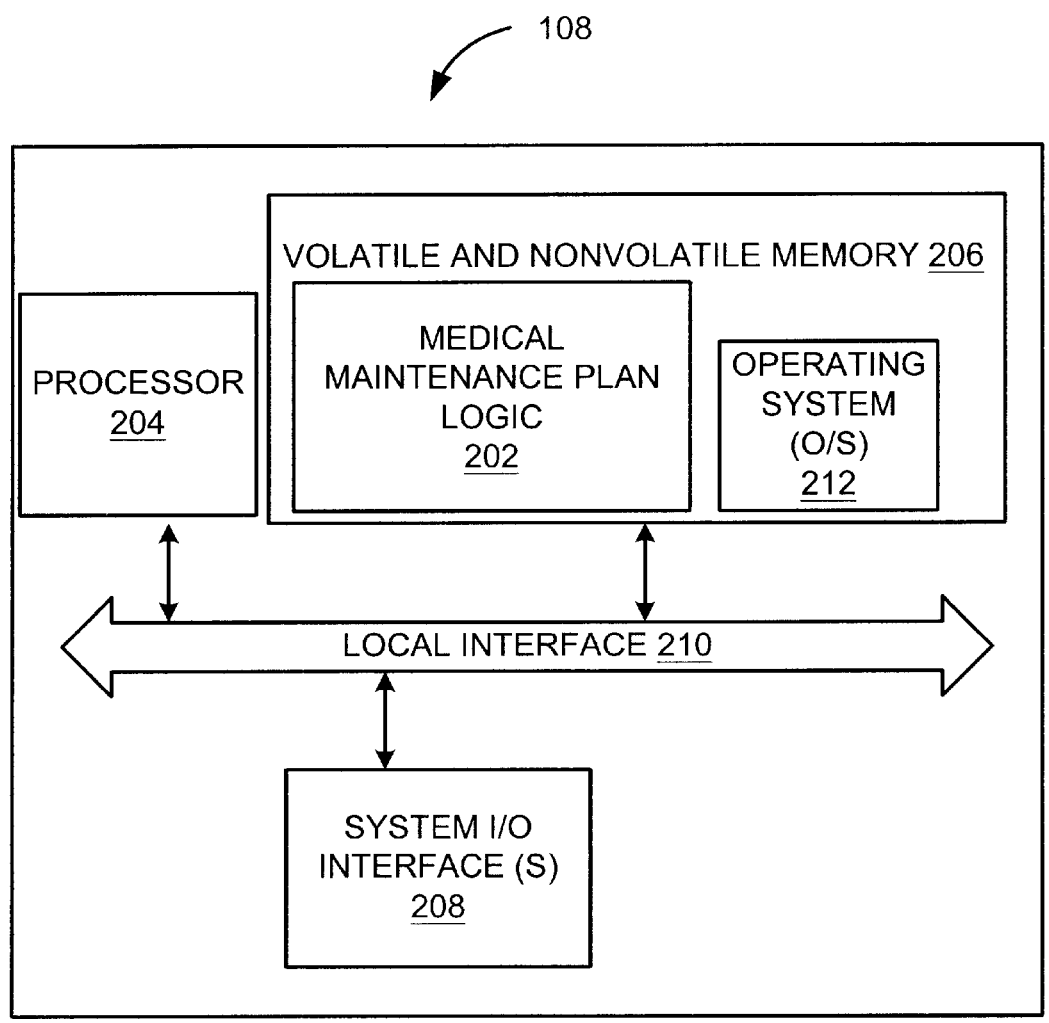
FIG. 2 is a block diagram depicting one example of a computing device that can be used to implement one preferred embodiment of a medical dispatch system.

FIG. 2 is a block diagram depicting a preferred embodiment of a processing device 108 for implementing the medical dispatch system 100. The processing device 108 includes medical maintenance plan logic 202 that can be implemented in software (e.g., programming stored on a medium, firmware, etc.), hardware, or a combination thereof. In the preferred embodiments, the medical maintenance plan logic 202 is implemented in software as an executable program, and is executed by a special or general purpose digital computer, such as a personal computer (PC; IBM-compatible, Apple-compatible, or otherwise), workstation, minicomputer, or mainframe computer. In an alternative preferred embodiment, the medical maintenance plan logic 202 is incorporated in a technician dispatch system that includes an indication that the customer should receive special handling.

Generally, in terms of hardware architecture, the processing device 108 includes, inter alia, a processor 204 and memory 206. Input and/or output (I/O) devices 208 (or peripherals) can be communicatively coupled to a local interface 210. The local interface 210 can be, for example but not limited to, one or more buses or other wired or wireless connections, as is known in the art. The local interface 210 may have additional elements, which are omitted for simplicity, such as controllers, buffers (caches), drivers, repeaters, and receivers, to enable communications. Further, the local interface 210 may include address, control, and/or data connections to enable appropriate communications among the aforementioned components.

The processor 204 is preferably a hardware device for executing software, particularly that stored in memory 206. The processor device 204 can preferably be any custom made or commercially available processor, a central processing unit (CPU), an auxiliary processor among several processors, a semiconductor based microprocessor (in the form of a microchip or chip set), a macroprocessor, or generally any device for executing software instructions.

The memory 206 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 206 may incorporate electronic, magnetic, optical, and/or other types of storage media. Note that the memory 206 can have a distributed architecture, where various components are situated remote from one another, but can be accessed by the processor 204.

The software and/or firmware in memory 206 may include one or more separate programs, each of which comprises an ordered listing of executable instructions for implementing logical functions. In the example of FIG. 2, the software in the memory 206 includes the medical maintenance plan logic 202 and a suitable operating system (O/S) 212. The operating system 212 essentially controls the execution of other computer programs, such as logic 202, and provides scheduling, input-output control, file and data management, memory management, and communication control and related services.

The medical maintenance plan logic 202 is preferably a source program, executable program (object code), script, or any other entity comprising a set of instructions to be performed. When logic 202 is implemented as a source program, then the program needs to be translated via a compiler, assembler, interpreter, or the like, which may or may not be included within the memory 206, so as to operate properly in connection with the O/S 212. Furthermore, logic 202 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The I/O devices 208 may preferably include input devices, for example but not limited to, a keyboard, mouse, scanner, microphone, etc. Furthermore, the I/O devices 208 may also include output devices, for example but not limited to, a printer, display, etc. Finally, the I/O devices 208 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

When the logic 202 is implemented in software, it should be noted that the logic 202 could preferably be stored on any computer-readable medium for use by or in connection with any computer-related system or method. The logic 202 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. If implemented in hardware, as in an alternative embodiment, the logic 202 can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 3:
FIG. 3 is an illustrative example of a trouble ticket of the medical dispatch system for a customer under a medical maintenance plan of a medical dispatch system.

FIG. 3 is an illustrative example of a trouble ticket 300 for a customer under a medical maintenance plan of the medical dispatch system 100. Generally, a trouble ticket 300 includes information compiled from telephone company records and/or based upon conversations between a dispatch clerk 112 and customers requesting service. In one embodiment, the "ticket" is not an actual piece of paper, but one or more electronic communications to the portable processing device 110. The trouble ticket 300 provides the technician 114 with information necessary to begin the trouble resolution process. In one embodiment, the trouble ticket 300 includes customer information such as customer name, address and telephone number. Customer information also includes telephone service plans the customer subscribes to and/or receives, for instance a medical maintenance plan (MMP) or an inside wiring plan (IWP). The IWP provides for service of telephone wiring inside a customer's residence. The medical maintenance plan provides for a qualified residential customer receiving priority service over other residential customers when requesting service.

To qualify for the medical maintenance plan, the customer must satisfactorily provide documentation, or other information, showing a medical or other approved need. Documentation can include a letter from a physician, home health provider, or other health care provider that indicates that the customer has a medical condition that requires constant telephone access. The following are illustrative examples of medical conditions that would qualify the customer for the medical maintenance plan: terminally ill customers; homebound customers; bed bound customers; elderly customers; certain cancer patients; paralyzed patients; among others. In a preferred embodiment, these customers receive the medical maintenance plan at no additional cost. A fee based option of the medical maintenance plan would be available for patients not in the categories listed above, yet have a need for priority telephone repair service for medical reasons. Customers in this category may include those who are home alone recovering from an illness or surgical procedure and utilize the telephone to signal for help.

The trouble ticket 300 also provides for a description of the problem. In the example shown in FIG. 3, the customer is reporting that they are out of service, (out of service—yes (OOSY)), have no dial tone (NDT), are elderly, and request service as soon as possible (ASAP). Other illustrative examples of descriptions of troubles include out of service—no (OOSN), tree fell on line, technician working in area, static on line, among others (a non-exhaustive list). A telephone representative may enter other descriptive information as appropriate in this section of the trouble ticket 300. Telephone facilities are also listed on the trouble ticket 300. Certain information regarding telephone facilities may be automatically populated based upon the telephone number of the customer. For instance, when the customer installed the telephone line, a specific engineering layout was utilized to design the customer's telephone service, such as for instance, two-wire facilities or four-wire facilities. The customer specific facility configuration may be provided on the trouble ticket 300 so that the technician can properly assess the problem, test, and restore the facilities.

Figure 4:
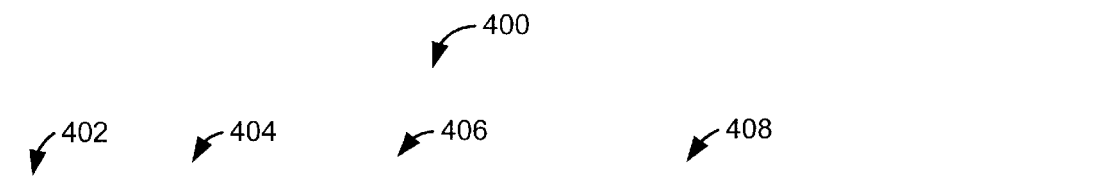
FIG. 4 is an illustrative example of a work list for a telephone technician that provides the technician with a listing of customers requesting service including customers to receive priority service under a medical maintenance plan of the medical dispatch system.

FIG. 4 is an illustrative example of a work list 400 for a telephone technician 114 that provides the technician 114 with a listing of customers requesting service including customers to receive priority service under a medical maintenance plan of the medical dispatch system 100. In one embodiment, the work list 400 includes a priority indicator 402, customer name 404, customer telephone number 406, and customer address 408. The technician 114 schedules service repair appointments or visits utilizing the work list 400. The work list 400 can include customers scheduled for service the current day, the next day, or week. In addition, the work list 400 can include a list of past due customers still awaiting repair service. In one embodiment, the work list 400 includes both installation and repair service requests. In another embodiment, the work list 400 includes only repair service requests. In still another embodiment, the work list 400 includes only installation service requests.

The priority indicator 402 includes whether the customer is a residential or business customer, and if a residential customer, whether the customer is under a medical maintenance plan (R-MMP). In one preferred embodiment, the business customer receives that highest priority for telephone service repairs. Preferably, a business customer that requests service before 10 a.m. will receive telephone repair service the same day. If the business customer requests service after 10 a.m., a technician will preferably arrange to visit the business customer as the first appointment the next day. The residential customer under the medical maintenance plan (R-MMP) will receive the next highest priority for telephone service repairs. Preferably, a technician 114 will repair the service to the R-MMP customer before repairing the service of residential customers not under a medical maintenance plan. Of course, the residential customer under the R-MMP could be placed as a higher priority than a business customer.

Figure 5A:
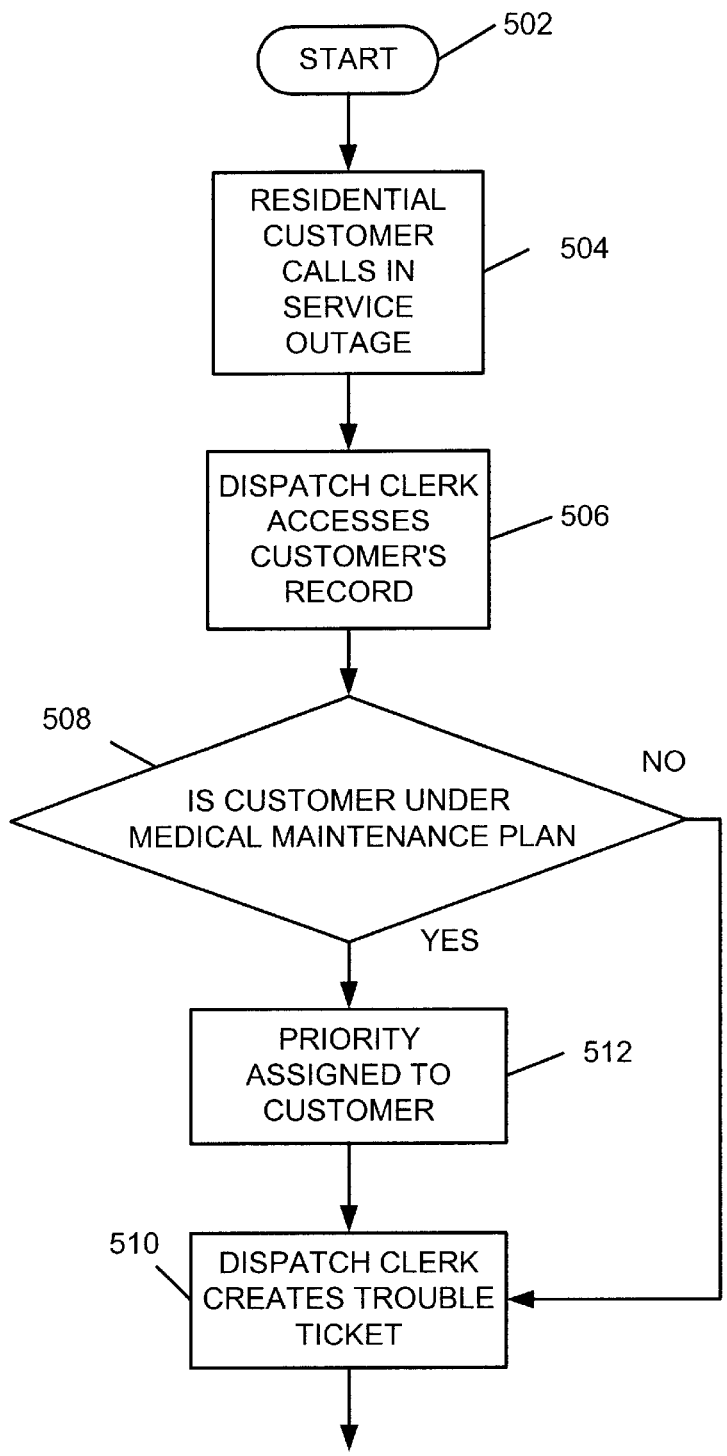

FIGS. 5A and 5B are flowcharts depicting general functionality (or methods), in accordance with one preferred embodiment, of an implementation of a medical dispatch system. The process begins at 502. At 504, a residential customer calls a telephone service representative for service repairs, such as a service outage. In a preferred embodiment, a dispatch clerk answers the trouble reporting telephone number. At 506, the dispatch clerk accesses the customer's record. In one preferred embodiment, the dispatch clerk utilizes caller identification information to determine which record is associated with the customer. In another embodiment, the dispatch clerk utilizes the customer's automatic number information that appears on a display of the dispatch clerk's processing device to determine which record is associated with the customer. In still another embodiment, the dispatch clerk creates a record for the customer based on information received from the customer.

At 508, the dispatch clerk determines whether the customer is under a medical maintenance plan. In one embodiment, the dispatch clerk searches for an indication of the customer's record that the customer is under a medical maintenance plan. In another embodiment, the dispatch clerk requests documentation from the customer to confirm that the customer is under the medical maintenance plan. Documentation may include a letter from a qualified health care provider, home health care provider, or other qualifying organization. In another alternative embodiment, the dispatch clerk contacts a qualifying organization to confirm medical needs of the customer, and updates the customer's records to indicate that the customer is under the medical maintenance plan. If it is determined that the customer is not under a medical maintenance plan or the service requested by the customer does not qualify for priority under the medical maintenance plan, at 510, the dispatch clerk creates a trouble ticket. In this case, the customer will receive service utilizing standard, non-priority response times. If it is determined that the customer is under a medical maintenance plan or does qualify for the medical maintenance plan, at 512, the dispatch clerk assigns a priority to the customer's service request. The trouble ticket created at 510 will includes thereon an indication of the priority. The process continues on FIG. 5B.

Referring to FIG. 5B, at 514, the trouble ticket information is transmitted from the dispatch clerk's processing device to a laptop computer assigned to the technician. In one embodiment, the dispatch clerk's processing device creates a work list utilizing the trouble ticket information. The work list is transmitted from the dispatch clerk's processing device to the technician's laptop computer. Preferably, the technician assigned to provide telephone installation and repair service in the customer's area receives the trouble ticket. At 516, the technician accesses a work list of scheduled jobs. In one embodiment, the technician logs into their laptop computer to receive the work list. Preferably, the work list includes jobs due that day. At 518, the work list is displayed and includes the customer under the medical maintenance plan appearing as a priority residential customer. For example, a priority notation can be symbols or words, such as R-MMP. In another embodiment, the customer under the MMP is highlighted on the work list, listed as the first customer, or scheduled as the technicians' first job as an indication to the technician that the customer should receive priority service. At 520, the technician restores service to the customer under the medical maintenance plan before other residential customers. The process ends at 522.

Figure 6:
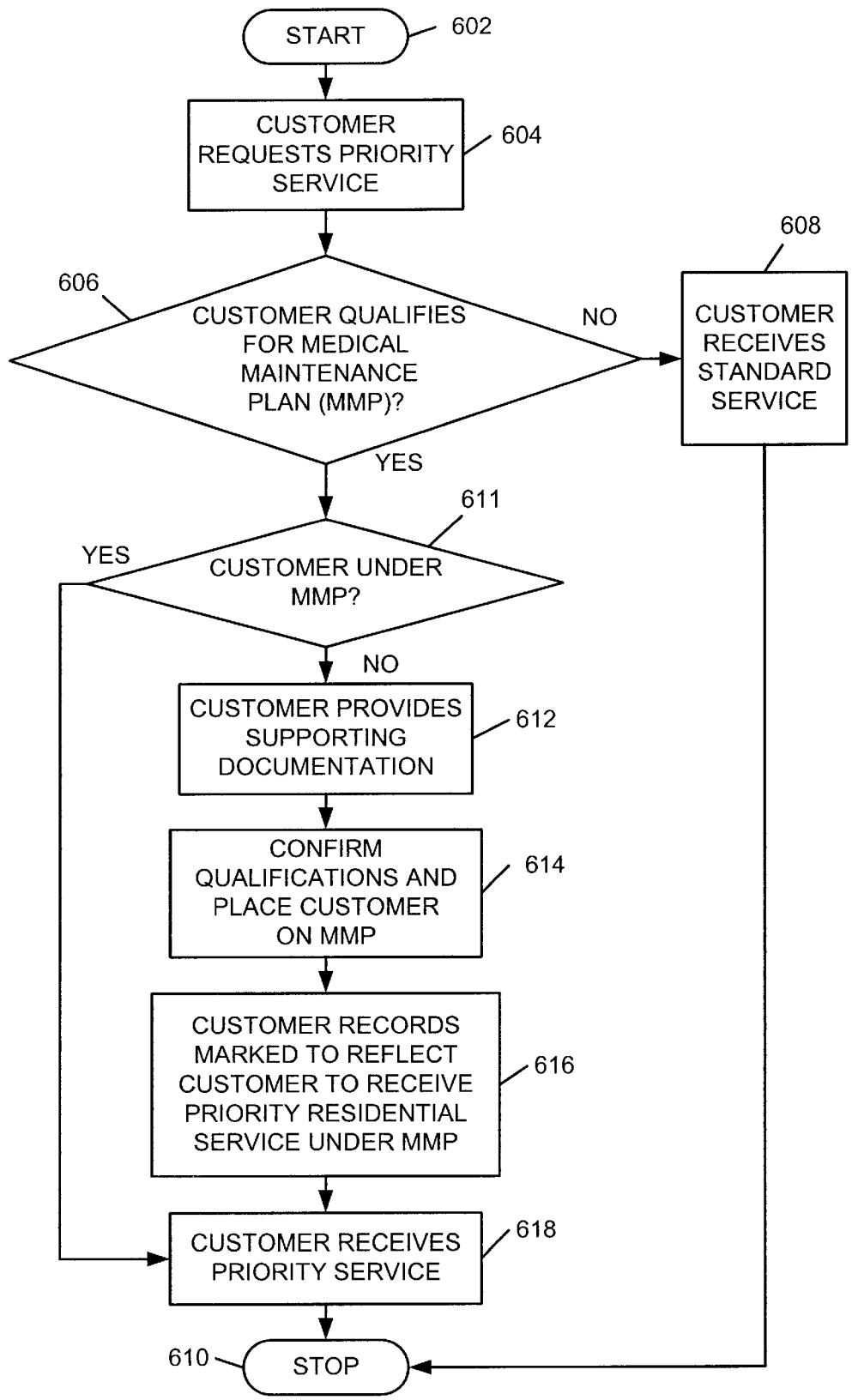
FIG. 6 is a flow chart depicting general functionality, in accordance with one preferred embodiment, of an implementation of indicating that a customer is under a medical maintenance plan of a medical dispatch system.

FIG. 6 is a flow chart depicting general functionality (or method), in accordance with one preferred embodiment, of an implementation of indicating that a customer is under a medical maintenance plan of a medical dispatch system. The process begins at 602. At 604, the customer requests priority service. In a preferred embodiment, the customer calls a repair service telephone number and speaks with a clerk who screens the customer. At 606, the clerk determines whether the customer qualifies for the medical maintenance plan (MMP). If the clerk determines that the customer does not qualify under the medical maintenance plan, at 608, the customer receives standard telephone service. Standard telephone service may include preparing a trouble report, creating a trouble ticket and placing the customer's request in a queue on a technician's work list to be worked in due course. The process ends at 610.

If the clerk determines that the customer does qualify for the medical maintenance plan, at 611, the clerk determines whether the customer is currently under a MMP. If no, at 612, the customer provides documentation supporting why they should receive priority service available under the MMP. At 614, upon confirming the customer's qualifications, the customer is placed on the MMP. At 616, the clerk, or other personnel, mark or update the customer records to reflect that the customer is to receive priority residential service under the MMP. At 618, the customer receives priority service. The process ends at 610.

If at 611, the clerk determines that the customer is currently under a MMP, then, at 618, the customer receives priority service. The process ends at 610.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. Other embodiments simply include adding a medical indicator to a customer record. This medical indicator is, in some embodiments, used by a service provider to give priority service. In some embodiments, a process for adding a medical indicator includes a verification process, and in others, such an indicator is used by billing systems to charge a customer money for such a service. All such modifications and variations are intended to be included herein within the scope of this disclosure and the present invention and protected by the following claims.

Therefore, having thus described the invention, at least the following is claimed:

1. A system for providing priority service repair, comprising:

a dispatch processing system for processing service repair requests from customers;

a work list generated by the dispatch processing system, the work list including an indicator that a customer is under a medical maintenance plan; and a technician processing system for receiving and displaying the work list.

2. The system of claim 1, further comprising a communications network operatively coupled to the dispatch processing system and the technician processing system, the communications network is configured to send and receive the work list between the dispatch processing system and the technician processing system.

3. The system of claim 2, wherein the technician processing system further comprises a wireless system for receiving the work list through a wireless transmission from the dispatch transmission system.

4. The system of claim 1, wherein the communications network is further configured to provide access to customer records stored in a processing device of at least one of a work management center, a data center or a central office.

5. The system of claim 1, further comprising a trouble ticket generated by the dispatch processing system.

6. The system of claim 5, wherein the trouble ticket further comprises at least one of customer service information, service request, facility information or medical maintenance plan priority indication.

7. The system of claim 1, wherein the work list further comprises at least one of customer repair requests from business, residential or residential customers under the medical maintenance plan.

8. The system of claim 7, wherein the work list is configured to indicate that the repair requests for residential customers under the medical maintenance plan are a higher priority than repair requests of customers not under a medical maintenance plan.

9. The system of claim 1, further comprising a plurality of databases accessible by the dispatch processing system, the plurality of databases configured to provide customer records.

10. The system of claim 9, wherein the processing system is configured to provide for data entry into the customer records.

11. The system of claim 1, wherein the work list further comprises at least one of a priority, customer name, telephone number or address.

12. The system of claim 1, wherein the eligibility of a customer to be included in the medical maintenance plan is verified.

13. The system of claim 1, wherein if the eligibility cannot be verified, a fee may be paid for inclusion in the medical maintenance plan.

14. A method for providing a medical dispatch, comprising the steps of:

receiving a request from a customer for priority repair service;

determining whether the customer is eligible to receive priority repair service based upon a medical maintenance plan; and dispatching a technician to the customer's residence for a priority repair service when the customer qualifies under the medical maintenance plan.

15. The method of claim 14, further comprising transmitting a work list from a dispatch processing system to a technician's processing system, the work list including an indication that the customer is to receive priority repair service due to the medical maintenance plan.

16. The method of claim 14, further comprising repairing a customer's service under a medical maintenance plan before repairing service of another residential customer not under a medical maintenance plan.

17. The method of claim 14, further comprising accessing a customer's record to determine whether the customer is under a medical maintenance plan.

18. The method of claim 14, further comprising adding the customer to the medical maintenance plan and indicating on the customer's record that the customer is under the medical maintenance plan.

19. The method of claim 14, further comprising creating a trouble ticket for the customer that indicates that the customer is to receive priority repair service based upon the medical maintenance plan.

20. The method of claim 14, wherein if the customer is not eligible to receive priority repair service based upon a medical maintenance plan, a fee may be charged for inclusion in the plan.

21. A computer-readable medium having a computer program for a system for tracking billing escalations, comprising:

logic configured to process a request from a customer for priority repair service;

logic configured to determine whether the customer is eligible to receive priority repair service based upon a medical maintenance plan; and logic configured to dispatch a technician to the customer's residence for a priority repair service when the customer qualifies under the medical maintenance.

22. The computer-readable medium of claim 21, further comprising logic configured to transmit a work list having an indication that the customer is to receive priority repair service due to the medical maintenance plan from a dispatch processing system to a technician's processing device.

23. The computer-readable medium of claim 21, further comprising logic configured to add the customer to the medical maintenance plan and to indicate on the customer's record that the customer is under the medical maintenance plan.

24. The computer readable medium of claim 21, further comprising logic configured such that, if a customer is determined to be ineligible for the medical maintenance plan, a fee may be accepted to receive priority service.

* * * * *